Figure 1:
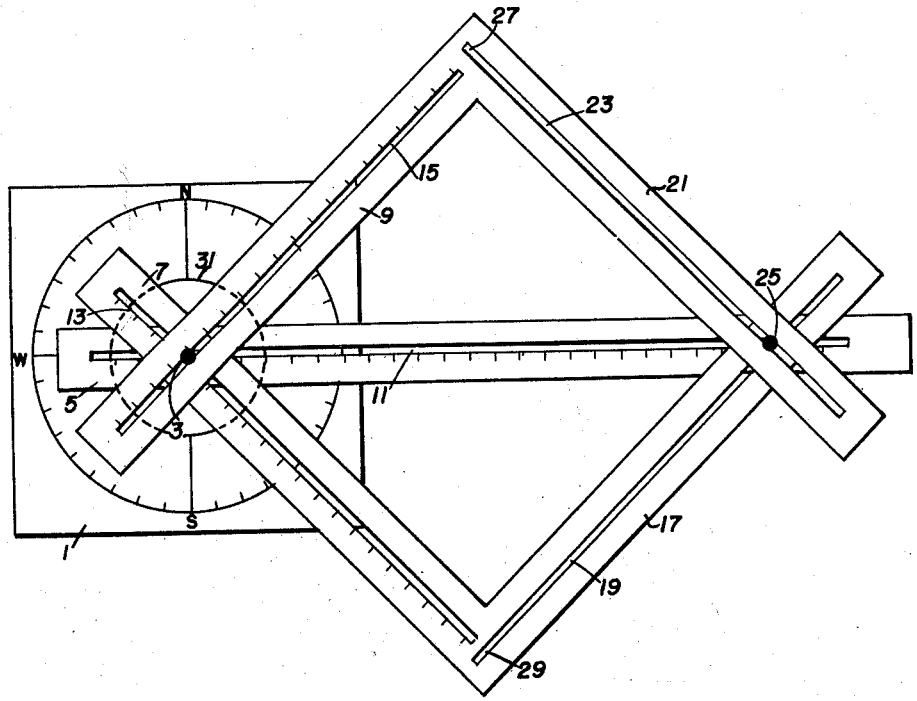
Figure 2:
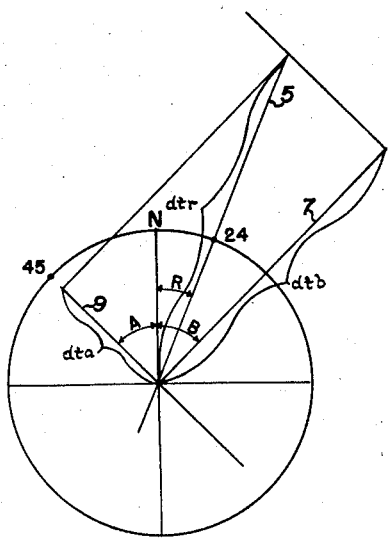
Figure 3:
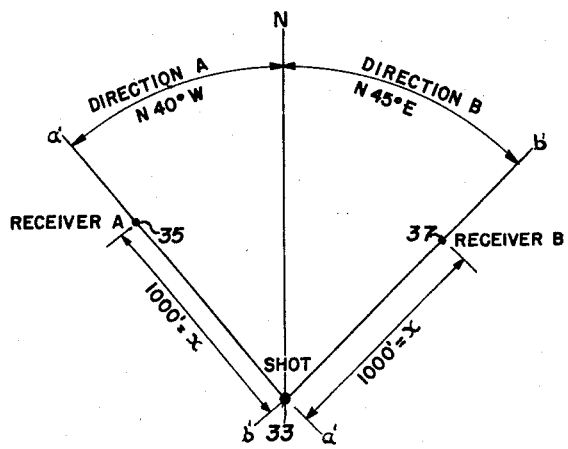
Figure 5:
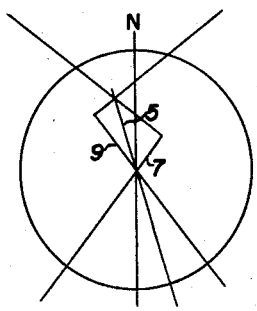
Figure 4:
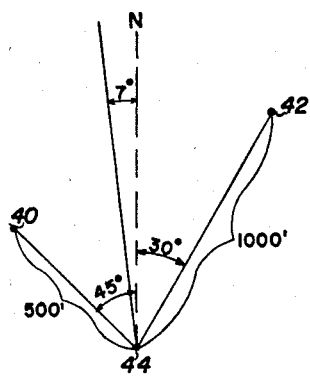

March 15, 1960 — T. A. GARRITY, JR — 2,928,179
PROBLEM SOLVING DEVICE

Filed Sept. 24, 1957 — 2 Sheets-Sheet 1

INVENTOR.
THOMAS A. GARRITY, JR.
BY
ATTORNEY

March 15, 1960     T. A. GARRITY, JR     2,928,179
PROBLEM SOLVING DEVICE

Filed Sept. 24, 1957     2 Sheets-Sheet 2

INVENTOR.
THOMAS A. GARRITY, JR.
BY
ATTORNEY

United States Patent Office 2,928,179
Patented Mar. 15, 1960

2,928,179

PROBLEM SOLVING DEVICE

Thomas A. Garrity, Jr., Tulsa, Okla., assignor to The Pure Oil Company, Chicago, Ill., a corporation of Ohio Application September 24, 1957, Serial No. 685,954

11 Claims. (Cl. 33—75)

This invention relates to a device for solving simultaneously two equations involving two unknown quantities and it is more particularly related to a device for determining true rate and direction of dip of geological formations when the apparent rate and direction of dip in two directions is known.

The present practice in determining true rate and direction of dip from two known components is to accurately plot the known data on a graph and then measure the distance and angle representing true rate and direction of dip. My invention is designed to mechanically determine these quantities without the necessity of preparing a graph and making the necessary measurements.

An object of the invention is to provide a device for mechanically solving two equations simultaneously for two unknown quantities.

Another object of the invention is to provide a mechanical device for determining the true rate and direction of dip of geological formations.

A still further object of the invention is to provide a mechanical process for making geological calculations and determinations.

Other objects of the invention will appear from the following description and accompanying drawing, of which Figure I is a plan view of the device in accordance with my invention; Figures II and III are illustrations of how the device is used for determining true direction of dip and true rate of dip from seismographic data; and Figures IV and V are illustrations of how the device is used based on geological data.

Referring to Figure I, numeral 1 indicates a 360° protractor marked off with degree marks so that bearings can be read from north and south directly. Each quadrant of the protractor is marked off in 90 degrees, starting from zero at the north and south points and progressing to 90 degrees from each of these points to west and east.

Mounted at the center of the protractor by means of pin 3 are three slidable arms 5, 7 and 9. Arm 5 is formed with narrow elongated slot 11, arm 7 is formed with narrow elongated slot 13, and arm 9 is formed with narrow elongated slot 15. Pin 3 is fastened to protractor 1 at the center and extends through slots 11, 13 and 15 so that arms 5, 7 and 9 can slide on the pin.

The arms 7 and 9 are sufficiently long so that the slots in the respective arms have a length approximately twice the diameter of the protractor. For example, if the diameter of the protractor circle is 3.5 inches the slots in each arm will be approximately 7 inches. In a device of this size the slot in arm 5 will be about 8 inches long. Each of the arms is marked off adjacent the slot with a scale which is preferably, absolute linear, i.e. the distance between adjacent scale markings is equal. The scale markings can be in terms of one thousandths of a second for use by geophysicists or in terms of feet for use by geologists.

Arm 5 is straight. Arm 7 is formed with a right angle extension 17 having a narrow, elongated slot 19. Arm 9 is likewise formed with a right angle extension 21 having a narrow, elongated slot 23. Slots 13 and 19 are perpendicular to each other as are slots 15 and 23. Arm 7 with its extension 17 is a mirror image of arm 9 with its extension 21. Pin 25 is fastened to arm 5 adjacent one end thereof and in line with the center line of slot 11. Pin 25 passes through slots 19 and 23. Pins 3 and 25 hold the three arms in sandwich relationship in a manner to permit the three arms 5, 7 and 9 to slide on pin 3 and the two extensions 17 and 21 to slide on pin 25. Slots 11, 13, 15, 19 and 23 should all be of the same width and as narrow as is practical to accommodate pins 3 and 25. Extensions 17 and 21 are of the same length as or of greater length than the arms 7 and 9. The markings on arm 9 should begin with zero at point 27 at the intersection of the center lines of slots 15 and 23 and the markings on arm 7 should begin with zero at point 29 at the intersection of the center lines of slots 13 and 19. The scale markings on arm 5 should be marked from pin 25 as the zero point. It will be understood, of course, that the scale markings and distances on the three arms will be identical.

In order to avoid reading the scale markings adjacent the center pin 3, I prefer to provide the protractor with an index circle 31 concentric with pin 3. By compensating the scale markings to take into account the radius of circle 31, the correct distance from points 25, 27 and 29 to the pin 3 can be read at the coincidence of the scale marking and index circle. Such compensation can be obtained by displacing each of the aforementioned scales in a direction toward its zero point and for a distance equal to the radius of the index circle.

If desired the scales on arms 5, 7 and 9 may be calibrated in a non-linear manner so that for a particular type situation the true dip could be read in degrees. Thus if the scale is calibrated using a tangent curve rather than a linear curve, the dip in degree could be read directly. But in order to make the device more universal, it is best to use linear scale calibration and convert to degrees if necessary.

My device may be made from thin sheet metal, plastic or other material and should be assembled with appropriate type pins, such as "Chicago screw" type pins so as to enable the arms to slide on the pins but to have sufficient frictional engagement to hold a position in which the arms have been set.

The following example will demonstrate the manner in which the device is used. An explosive charge is detonated near the surface of the earth at point 33 (Fig. III) and the sound is recorded at two different points 35 and 37 on the earth's surface each of which is 1,000 feet from the shot in the directions shown in Figure III. The problem is to determine the true "move-out" time per unit distance and true direction of dip from move-out times per unit distance in the two known directions. The problem is graphically illustrated in Figure II. The known move-out time ($dt_a$) per unit distance is recorded in direction A. The known move-out time ($dt_b$) per unit distance is recorded in direction B. The problem is to find the true move-out time ($dt_R$) per unit distance or true rate of dip and true direction of dip R. The relationship between these values is as follows:

$$dt_R = \frac{dt_a}{\cos(A+R)} \qquad dt_R = \frac{dt_b}{\cos(B-R)}$$

To solve these equations the value of $dt_a$ and the direction A is set on arm 9. The value for $dt_b$ and the direction B is set on arm 7. The value $dt_R$ can then be read on arm 5 and the direction R will be the angle between arm 5 and due north, read directly from the protractor.

Assume the movement time ($dt_a$) in direction A is .005 second and the movement time ($dt_b$) in direction B is .010 second. These times will be set on arms 9 and 7 respectively in the direction of N 40° W and N 45° E respectively. The true direction of dip (angle R) is N 24° E and the true rate of dip is .0105 second per 1000 feet, read on arm 5.

To illustrate the use of the device by a geologist in reference is made to Figures IV and V. The logs on these dip from log information on three wells, 40, 42 and 44, reference is made to figures IV and V. The logs on these wells show their depth as follows:

| | Feet below sea level |
|---|---|
| Well 40 | 300 |
| Well 44 | 200 |
| Well 42 | 400 |

The direction of well 40 from well 44 is N 45° W and the distance between wells is 500 feet. The direction of well 42 from well 44 is N 30° E and the distance between wells is 1000 feet. Thus the formation slopes downwardly from well 44 to 40, 200 feet per thousand feet of distance. Likewise the formation slopes downwardly 200 feet from well 44 to well 42 for each 1000 feet of distance. The scale markings on the arms will be in terms of feet. Thus by setting arm 9 for a distance of 200 feet at an angle of N 45° W and arm 7 for a distance of 200 at an angle of N 30° E, the maximum dip of 240 feet per thousand can be read on arm 5 and the direction of maximum dip (N 7° W) is read along the center line of arm 5.

It will be evident that by use of my device the necessity of preparing a graph as shown in Figure II and IV and of measuring distances and the angles is avoided.

I claim as my invention:

1. A device for solving simultaneously two equations comprising a protractor, three arms mounted on the face of the protractor by a pin fastened to the center of the protractor, one of said arms being straight and the other two arms being bent at right angles so as to form two adjacent sides of a rectangle, said straight arm and each side of said right angle arms having an elongated slot, the two slots in each right angle arm being also at right angles, said pin passing through the slot of said straight arm and a slot on one side of each of said right angle arms, a second pin fixed adjacent one end of said straight arm and passing through the slots on the other side of each of said right angle arms, said straight arm and said sides of the right angle arms through which said center pin passes having identical scale markings along their respective slots.

2. A device in accordance with claim 1 in which the protractor is divided into four 90° quadrants with degree markings in each quadrant from 0° beginning at both north and south points and advancing to 90° at the east and west points.

3. A device for solving simultaneously two equations comprising a protractor, three flat members mounted on the face of the protractor by a pin fastened to the center of the protractor, each of said members having an elongated slot through which said pin passes, two of said members having a second elongated slot at right angles to the first-mentioned slot in the same member, the third member having a pin fastened on the center line of and adjacent to one end of the slot in said third member, said third member pin passing through the second slots of the twice-slotted members, and identical scale markings disposed along each of the first-mentioned slots.

4. A device in accordance with claim 3 in which the protractor is a 360° protractor.

5. A device in accordance with claim 4 in which the protractor is divided into four 90° quadrants with degree markings in each quadrant from 0° beginning at both north and south points and advancing to 90° at the east and west points.

6. A device in accordance with claim 3 in which the scale markings are absolute linear markings in terms of time and the markings on said third member begin with the zero point at said third member pin and the zero points on said twice-slotted members being at the intersection of the center lines of the two slots in each said twice-slotted member.

7. A device in accordance with claim 3 in which the scale markings are absolute linear markings in terms of distance and the markings on said third member begin with the zero point at said third member pin and the zero points on said twice-slotted members being at the intersection of the center lines of the two slots in each said twice-slotted member.

8. A device in accordance with claim 5 in which the scale markings are absolute linear markings, the protractor is formed with an index circle concentric with said first-mentioned pin, and the scale markings are compensated to account for the radius of the index circle.

9. A device in accordance with claim 3 in which said twice-slotted members are mounted with the points of intersection of the center lines of the two slots in each said twice-slotted members on opposite sides of the slot in said third member.

10. A device in accordance with claim 9 in which the length of the first-mentioned slots in said twice-slotted members is about twice the diameter of the protractor.

11. A device according to claim 9 in which said twice-slotted members are mirror images of each other.

References Cited in the file of this patent

UNITED STATES PATENTS

| 115,318 | Hickman | May 30, 1871 |
| 1,661,095 | Rowe | Feb. 28, 1928 |

FOREIGN PATENTS

| 579,509 | France | Aug. 4, 1924 |

UNITED STATES PATENT OFFICE
CERTIFICATE OF CORRECTION

Patent No. 2,928,179 — March 15, 1960

Thomas A. Garrity, Jr.

It is hereby certified that error appears in the printed specification of the above numbered patent requiring correction and that the said Letters Patent should read as corrected below.

Column 3, lines 6 to 9, for "To illustrate the use of the device by a geologist in reference is made to Figures IV and V. The logs on these dip from log information on three wells, 40, 42 and 44, reference is made to figures IV and V." read -- To illustrate the use of the device by a geologist in determining maximum dip and direction of maximum dip from log information on three wells, 40, 42 and 44, reference is made to figures IV and V. --.

Signed and sealed this 23rd day of August 1960.

(SEAL)
Attest:

KARL H. AXLINE
Attesting Officer

ROBERT C. WATSON
Commissioner of Patents